US012812569B2

(12) United States Patent
Atungsiri et al.

(10) Patent No.: US 12,812,569 B2
(45) Date of Patent: Nov. 24, 2026

(54) METHODS, COMMUNICATIONS DEVICES, AND INFRASTRUCTURE EQUIPMENT

(71) Applicant: Sony Group Corporation, Tokyo (JP)

(72) Inventors: Samuel Asangbeng Atungsiri, Basingstoke (GB); Martin Warwick Beale, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 267 days.

(21) Appl. No.: 18/704,465

(22) PCT Filed: Sep. 20, 2022

(86) PCT No.: PCT/EP2022/076122

§ 371 (c)(1),
(2) Date: Apr. 25, 2024

(87) PCT Pub. No.: WO2023/078606

PCT Pub. Date: May 11, 2023

(65) Prior Publication Data

US 2025/0240741 A1 Jul. 24, 2025

(30) Foreign Application Priority Data

Nov. 3, 2021 (EP) .................................... 21206300

(51) Int. Cl.
*H04W 56/00* (2009.01)
*H04W 76/18* (2018.01)

(52) U.S. Cl.
CPC ........... *H04W 56/00* (2013.01); *H04W 76/18* (2018.02); *H04W 56/0015* (2013.01)

(58) Field of Classification Search
CPC . H04W 56/00; H04W 76/18; H04W 56/0015; H04B 7/18519
See application file for complete search history.

(56) References Cited

U.S. PATENT DOCUMENTS

2022/0394802 A1* 12/2022 Zhang ............... H04W 36/0055
2023/0098798 A1* 3/2023 Cheng ................... H04W 76/30 370/503

(Continued)

FOREIGN PATENT DOCUMENTS

EP 3799470 A1 3/2021

OTHER PUBLICATIONS

R1-2108781, FL Summary #4 on enhancements on UL time and frequency synchronization for NR NTN (Year: 2021).*

(Continued)

*Primary Examiner* — Oussama Roudani
(74) *Attorney, Agent, or Firm* — XSENSUS LLP

(57) ABSTRACT

A method of operating a communications device for transmitting signals to and/or receiving signals from a non-terrestrial network apparatus of a wireless communications network is provided. The method comprises determining that the communications device will lose uplink synchronisation with the wireless communications network at a first time, transmitting, to the non-terrestrial network apparatus before the first time, an indication that the communications device will lose uplink synchronisation with the wireless communications network, receiving, from the non-terrestrial network apparatus before the first time and in response to the transmitted indication, a signal comprising information for use by the communications device in re-acquiring uplink synchronisation with the wireless communications network until at least a second time, the second time being later than the first time, and re-acquiring, based at least in part on the received information, uplink synchronisation with the wireless communications network until the second time.

19 Claims, 6 Drawing Sheets

(56) References Cited

U.S. PATENT DOCUMENTS

| | | | | |
|---|---|---|---|---|
| 2024/0196351 A1* | 6/2024 | Lin | ..................... | H04W 56/001 |
| 2024/0224207 A1* | 7/2024 | Zhang | ............... | H04W 56/0015 |
| 2024/0292347 A1* | 8/2024 | Manolakis | ......... | H04B 7/18513 |
| 2024/0396784 A1* | 11/2024 | Wen | .................... | H04L 27/2655 |

OTHER PUBLICATIONS

International Search Report and Written Opinion mailed on Dec. 15, 2022, received for International Application No. PCT/EP2022/076122, filed on Sep. 20, 2022, 10 pages.

3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

3GPP, "3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763 V17.0.0, Jun. 2021, 73 pages.

3GPP, "3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

Moderator (Thales), "FL Summary #4 on enhancements on UL time and frequency synchronization for NR NTN", 3GPP TSG-RAN WG1 Meeting #106-bis-e, R1-2108781, Agenda Item: 8.4.2, Oct. 11-19, 2021, 113 pages.

3GPP, "3rd Generation Partnership Project; Technical Specification Group Radio Access Network; Study on New Radio (NR) to support non-terrestrial networks (Release 15)", 3GPP TR 38.811 V15.4.0, Sep. 2020, 127 pages.

Holma et al., "LTE for UMTS OFDMA and SC-FDMA Based Radio Access", John Wiley and Sons Ltd., 2009, 232 pages.

Thales, "Solutions for NR to support non-terrestrial networks (NTN)", 3GPP TSG RAN meeting #90-e, RP-202908, Agenda Item: 9.8.6, Dec. 7-11, 2020, 10 pages.

Mediatek Inc., "New Study WID on NB-IoT/eTMC support for NTN", 3GPP TSG RAN Meeting #86, RP-193235, Dec. 9-31, 2019, 4 pages.

Mediatek Inc. et al., "WID on NB-IoT/eMTC support for NTN", 3GPP TSG RAN Meeting #92-e, RP-211601, Agenda Item: 10.5.1, Jun. 14-18, 2021, 6 pages.

* cited by examiner

METHODS, COMMUNICATIONS DEVICES, AND INFRASTRUCTURE EQUIPMENT

CROSS-REFERENCE TO RELATED APPLICATIONS

The present application is a national stage application, pursuant to 35 U.S.C. § 371, of International Patent Application No. PCT/EP2022/076122, filed Sep. 20, 2022, which claims priority from European Patent Application No. 21206300.2, filed Nov. 3, 2021, the contents of each are hereby incorporated by reference.

BACKGROUND

Field of Disclosure

The present disclosure relates generally to wireless communications networks, and specifically to methods and devices for handling the transmission of uplink data more efficiently.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these and future networks, i.e. geographic locations where access to the networks is possible, may be expected to increase ever more rapidly.

Current and future wireless communications networks are expected to routinely and efficiently support communications with a wider range of devices associated with a wider range of data traffic profiles and types than previously developed systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for more advanced wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on airborne or space-borne vehicles [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device for transmitting signals to and/or receiving signals from a non-terrestrial network apparatus of a wireless communications network. The method comprises determining that the communications device will lose uplink synchronisation with the wireless communications network at a first time, transmitting, to the non-terrestrial network apparatus before the first time, an indication that the communications device will lose uplink synchronisation with the wireless communications network, receiving, from the non-terrestrial network apparatus before the first time and in response to the transmitted indication, a signal comprising information for use by the communications device in re-acquiring uplink synchronisation with the wireless communications network until at least a second time, the second time being later than the first time, and re-acquiring, based at least in part on the received information, uplink synchronisation with the wireless communications network until the second time.

Embodiments of the present technique, which, in addition to methods for operating communications devices, relate to communications devices, infrastructure equipment, methods for operating such infrastructure equipment, circuitry for such communications devices and infrastructure equipment, wireless communications systems, computer programs, and non-transitory computer-readable storage mediums, allow for the efficient and effective re-acquisition of uplink synchronisation by communications devices with wireless communications networks (and particularly with non-terrestrial networks), and thus allow for the more efficient utilisation of uplink resources by communications devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
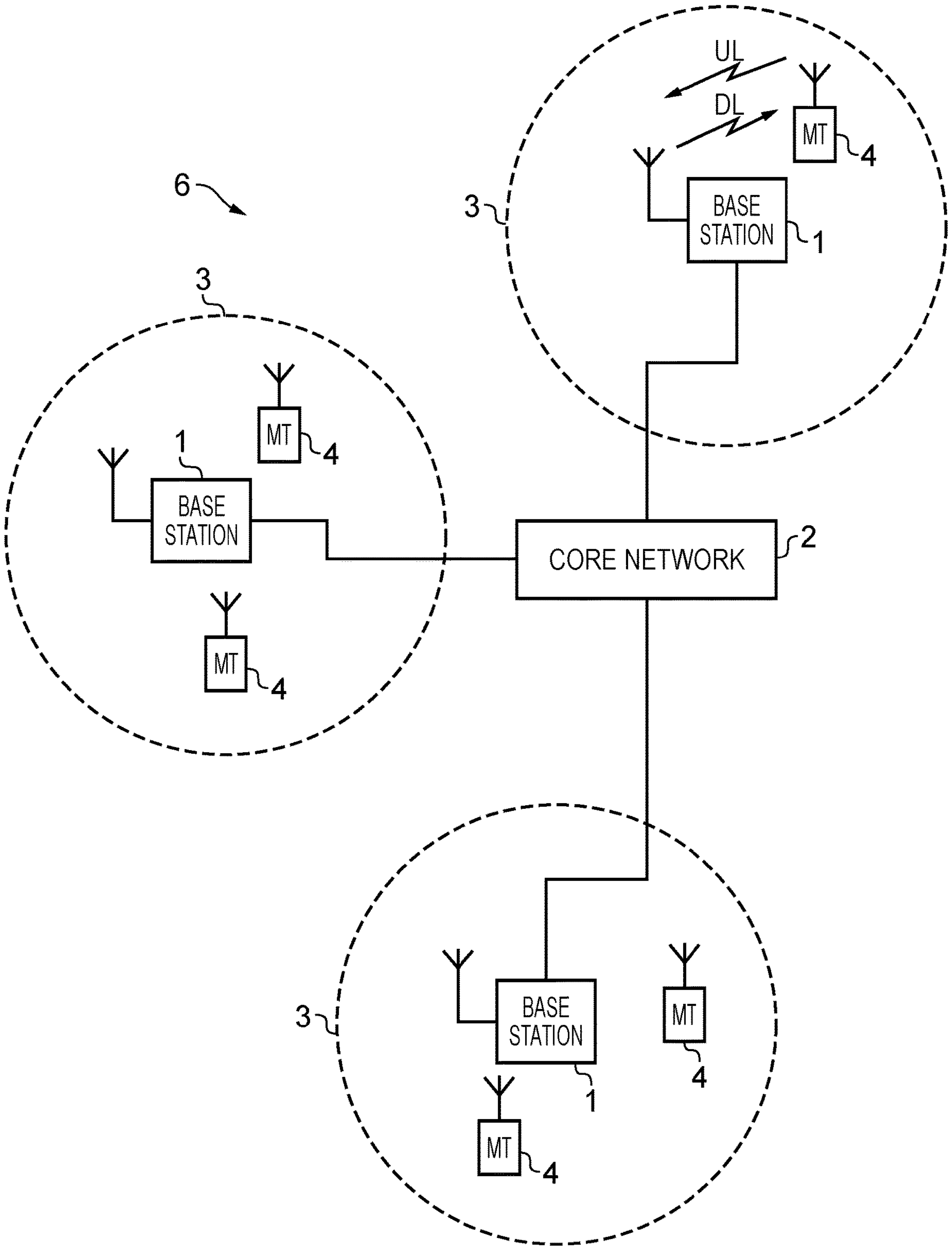
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink (DL). Data is transmitted from communications devices 4 to the base stations 1 via a radio uplink (UL). The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
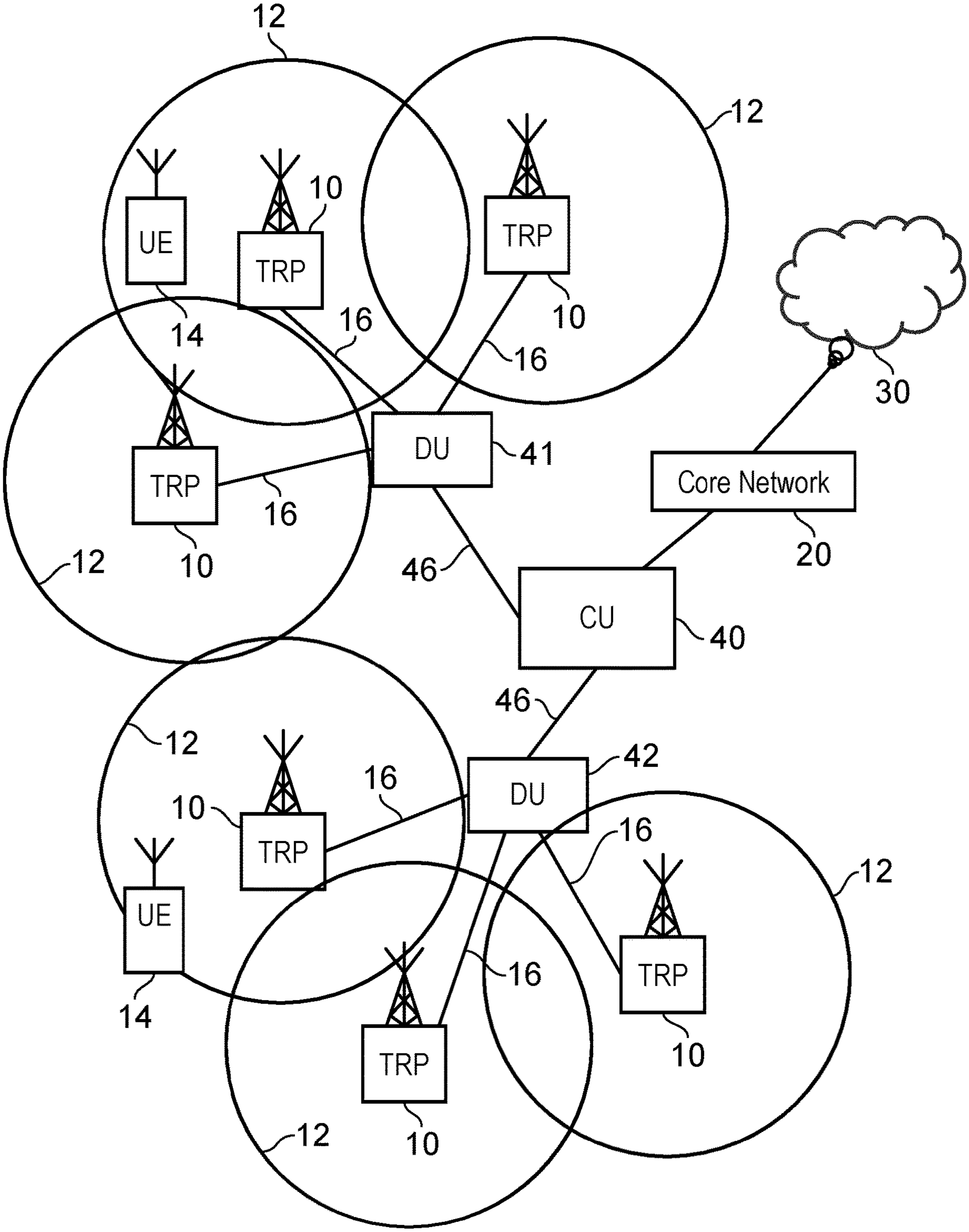
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
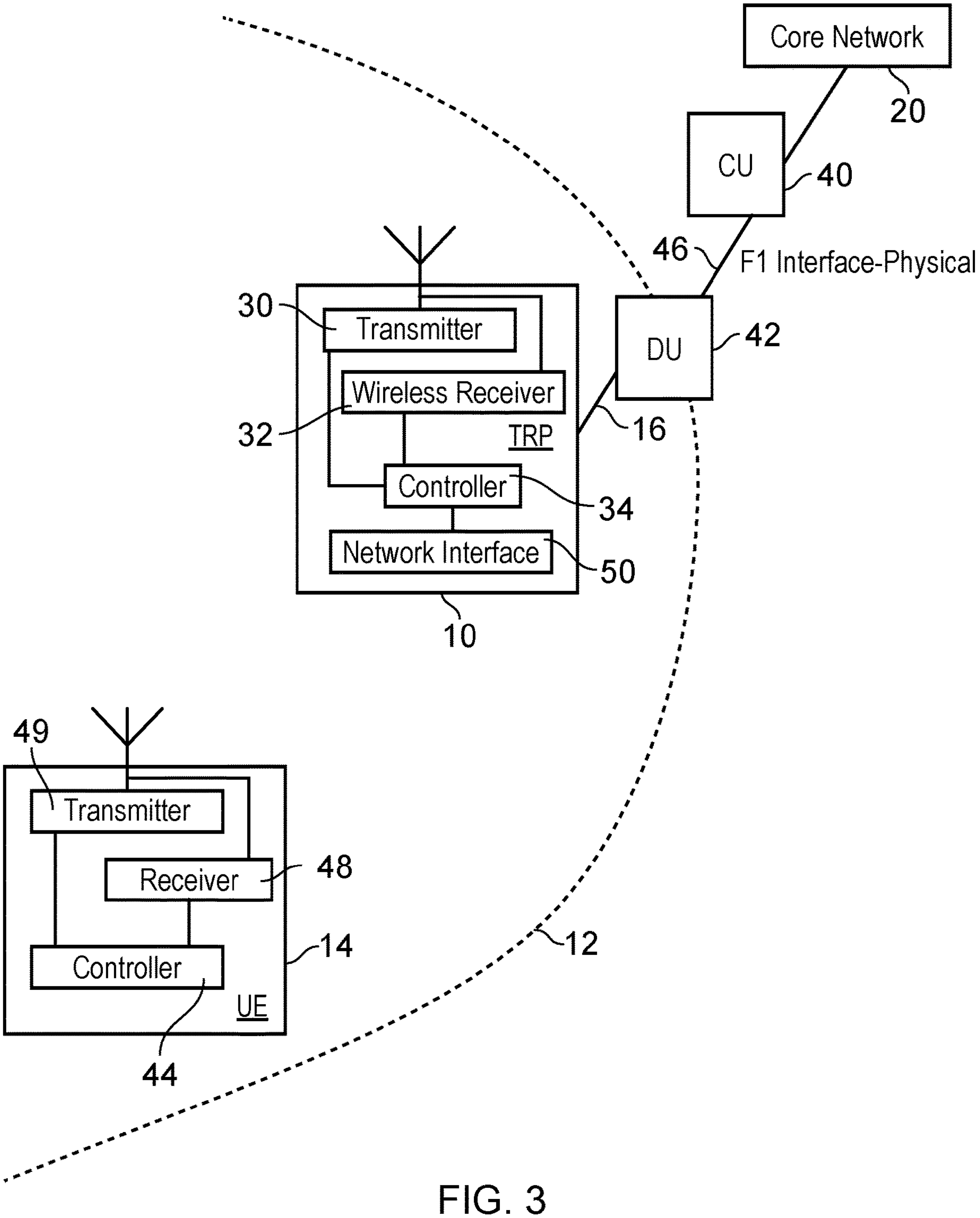
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s).

As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Non-Terrestrial Networks (NTNs)

Figure 4:
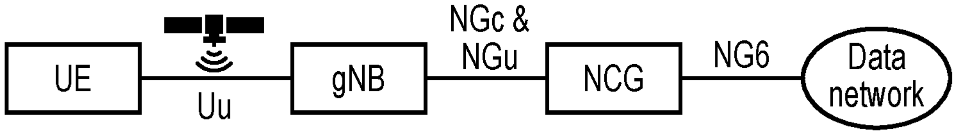
FIG. 4 is reproduced from [1], and illustrates a first example of a non-terrestrial network (NTN) featuring an access networking service based on a satellite/aerial platform with a bent pipe payload.
Figure 5:
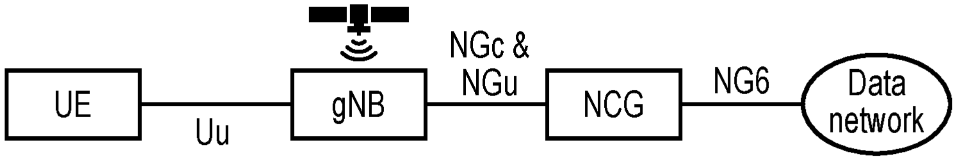
FIG. 5 is reproduced from [1], and illustrates a second example of an NTN featuring an access networking service based on a satellite/aerial platform that incorporates a gNodeB.

An overview of NR-NTN can be found in [1], and much of the following wording, along with FIGS. 4 and 5, has been reproduced from that document as a way of background.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by terrestrial 5G networks (isolated/remote areas, on board aircrafts or vessels) and underserved areas (e.g. sub-urban/rural areas) to upgrade the performance of limited terrestrial networks in a cost effective manner;
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to
- enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive. It should also be noted that the same NTN benefits apply to other technologies such as 4G and/or LTE technologies, and that while NR is sometimes referred to in the present disclosure, the teachings and techniques presented herein are equally applicable to other technologies such as 4G and/or LTE and/or NB-IoT.

FIG. 4 illustrates a first example of an NTN architecture based on a satellite/aerial platform with a bent pipe payload, meaning that the signal received from the UE is simply reflected and sent back down to Earth by the satellite/aerial platform, with only frequency or amplification changing; i.e. acting like a pipe with a u-bend. In this example NTN, the satellite or the aerial platform will therefore relay a "satellite friendly" NR (or LTE) signal between the gNodeB (or eNodeB) and UEs in a transparent manner.

FIG. 5 illustrates a second example of an NTN architecture based on a satellite/aerial platform comprising a gNodeB (or eNodeB in the examples of the present disclosure) which may be referred to as non-terrestrial infrastructure equipment. In this example NTN, the satellite or aerial platform carries a full or part of a gNodeB/eNodeB to generate or receive an NR (or LTE) signal to/from the UEs. For example, in addition to frequency conversion and amplification, the satellite/aerial platform may also decode a received signal. This requires the satellite or aerial platform to have sufficient on-board processing capabilities to be able to include a gNodeB or eNodeB functionality.

Figure 6:
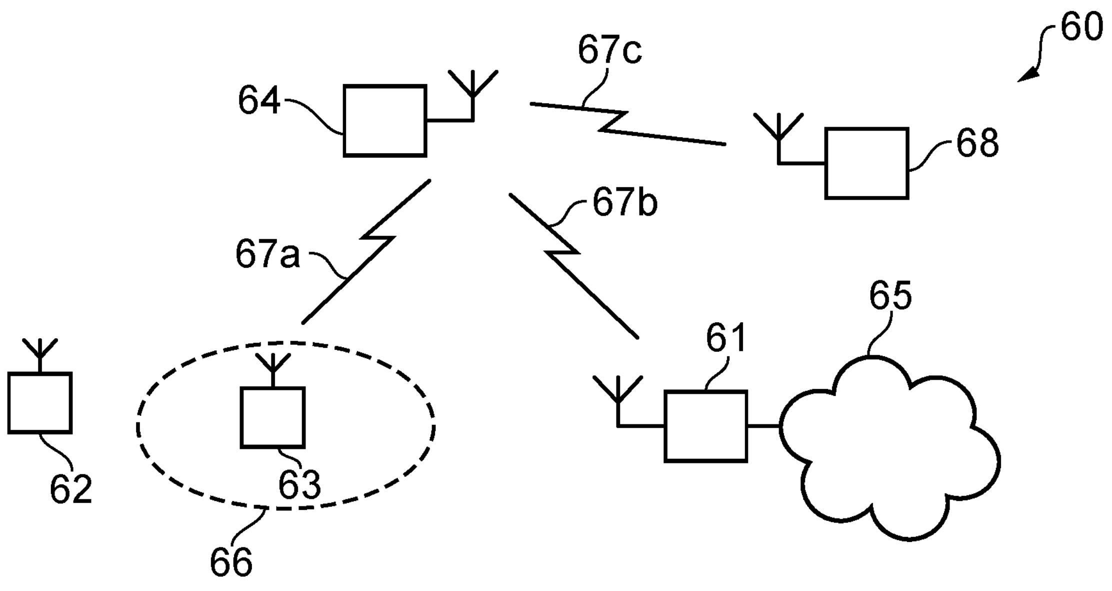
FIG. 6 schematically shows an example of a wireless communications system comprising an NTN part and a terrestrial network (TN) part which may be configured to operate in accordance with embodiments of the present disclosure.

FIG. 6 schematically shows an example of a wireless communications system 60 which may be configured to operate in accordance with embodiments of the present disclosure. The wireless communications system 60 in this example is based broadly around an LTE-type or 5G-type architecture. Many aspects of the operation of the wireless communications system/network 60 are known and understood and are not described here in detail in the interest of brevity. Operational aspects of the wireless communications system 60 which are not specifically described herein may be implemented in accordance with any known techniques, for example according to the current LTE standards or the current 5G standards.

The wireless communications system 60 comprises a core network part 65 (which may be a 4G core network or a 5G core network) in communicative connection with a radio network part. The radio network part comprises a base station (g-node B) 61 connected to a non-terrestrial network part 64. The non-terrestrial network part 64 may be an example of infrastructure equipment. Alternatively, or in addition, the non-terrestrial network part 64 may be mounted on a satellite vehicle or on an airborne vehicle.

The non-terrestrial network part 64 may communicate with a communications device 63, located within a cell 66, by means of a wireless access interface provided by a wireless communications link 67*a*. For example, the cell 66 may correspond to the coverage area of a spot beam generated by the non-terrestrial network part 64. The boundary of the cell 66 may depend on an altitude of the non-terrestrial network part 64 and a configuration of one or more antennas of the non-terrestrial network part 64 by which the non-terrestrial network part 64 transmits and receives signals on the wireless access interface.

The non-terrestrial network part 64 may be a satellite in an orbit with respect to the Earth, or may be mounted on such a satellite. For example, the satellite may be in a geo-stationary earth orbit (GEO) such that the non-terrestrial network part 64 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 64 may complete an orbit of the Earth relatively quickly, thus providing moving cell coverage. Alternatively, the satellite may be in a non-geostationary orbit (NGSO), so that the non-terrestrial network part 64 moves with respect to a fixed point on the Earth's surface. The non-terrestrial network part 64 may be an airborne vehicle such as an aircraft, or may be mounted on such a vehicle. The airborne vehicle (and hence the non-terrestrial network part 64) may be stationary with respect to the surface of the Earth or may move with respect to the surface of the Earth.

In FIG. 6, the terrestrial station 61 is shown as ground-based, and connected to the non-terrestrial network part 64 by means of a wireless communications link 67*b*. The non-terrestrial network part 64 receives signals representing downlink data transmitted by the base station 61 on the wireless communications link 67*b* and, based on the received signals, transmits signals representing the downlink data via the wireless communications link 67*a* providing the wireless access interface for the communications device 63. Similarly, the non-terrestrial network part 64 receives signals representing uplink data transmitted by the communications device 63 via the wireless access interface comprising the wireless communications link 67*a* and transmits signals representing the uplink data to the terrestrial station 61 on the wireless communications link 67*b*. The wireless communications links 67*a*, 67*b* may operate at a same frequency, or may operate at different frequencies.

The extent to which the non-terrestrial network part 64 processes the received signals may depend upon a processing capability of the non-terrestrial network part 64. For example, the non-terrestrial network part 64 may receive signals representing the downlink data on the wireless communication link 67*b*, amplify them and (if needed) re-modulate onto an appropriate carrier frequency for onwards transmission on the wireless access interface provided by the wireless communications link 67*a*. Alternatively, the non-terrestrial network part 64 may be configured to decode the signals representing the downlink data received on the wireless communication link 67*b* into unencoded downlink data, re-encode the downlink data and modulate the encoded downlink data onto the appropriate carrier frequency for onwards transmission on the wireless access interface provided by the wireless communications link 67*a*.

The non-terrestrial network part 64 may be configured to perform some of the functionality conventionally carried out by a base station (e.g. a gNodeB or an eNodeB), such as base station 1 as shown in FIG. 1. In particular, latency-sensitive functionality (such as acknowledging a receipt of the uplink data, or responding to a RACH request) may be performed by the non-terrestrial network part 64 partially implementing some of the functions of a base station.

As mentioned above, a base station may be co-located with the non-terrestrial network part 64; for example, both may be mounted on the same satellite vehicle or airborne vehicle, and there may be a wireless connection providing the coupling between the terrestrial station 61 and the base station co-located on the non-terrestrial network part 64. In such co-located arrangements, a wireless communications feeder link between the terrestrial station 61 and another terrestrial station (not shown) may provide connectivity between the terrestrial station 61 (co-located with the non-terrestrial network part 64) and the core network part 65.

The terrestrial station 61 may be an NTN Gateway that is configured to transmit signals to the non-terrestrial network part 64 via the wireless communications link 67*b* and to communicate with the core network part 65. That is, in some examples the terrestrial station 61 may not include base station functionality. For example, if the base station is co-located with the non-terrestrial network part 64, as described above, the terrestrial station 61 does not implement base station functionality. In other examples, the base station may be co-located with the NTN Gateway in the terrestrial station 61, such that the terrestrial station 61 is capable of performing base station (e.g. gNodeB or eNodeB) functionality.

In some examples, even if the base station is not co-located with the non-terrestrial network part 64 (such that the base station functionality is implemented by a ground-based component), the terrestrial station 61 may not necessarily implement the base station functionality. In other words, the base station (e.g. gNodeB or eNodeB) may not be co-located with the terrestrial station 61 (NTN Gateway). In this manner, the terrestrial station 61 (NTN Gateway) transmits signals received from the non-terrestrial network part 64 to a base station (not shown in FIG. 6). In such an example, the base station (e.g. gNodeB or eNodeB) may be considered as being part of core network part 65, or may be separate (not shown in FIG. 6) from the core network part 65 and located logically between the terrestrial station 61 (NTN Gateway) and the core network part 65.

In some cases, the communications device 63 shown in FIG. 6 may be configured to act as a relay node. That is, it may provide connectivity to one or more terminal devices such as the terminal device 62. When acting as a relay node, the communications device 63 transmits and receives data to and from the terminal device 62, and relays it, via the non-terrestrial network part 64 to the terrestrial station 61. The communications device 63, acting as a relay node, may thus provide connectivity to the core network part 65 for terminal devices which are within a transmission range of the communications device 63.

In some cases, the non-terrestrial network part 64 is also connected to a ground station 68 via a wireless link 67*c*. The ground station may for example be operated by the satellite operator (which may be the same as the mobile operator for the core and/or radio network or may be a different operator) and the link 67*c* may be used as a management link and/or to exchange control information. In some cases, once the non-terrestrial network part 64 has identified its current position and velocity, it can send position and velocity information to the ground station 68. The position and velocity information may be shared as appropriate, e.g. with one or more of the UE 63, terrestrial station 61 and base station, for configuring the wireless communication accordingly (e.g. via links 67*a* and/or 67*b*).

It will be apparent to those skilled in the art that many scenarios can be envisaged in which the combination of the communications device 63 and the non-terrestrial network part 64 can provide enhanced service to end users. For example, the communications device 63 may be mounted on a passenger vehicle such as a bus or train which travels through rural areas where coverage by terrestrial base stations may be limited. Terminal devices on the vehicle may obtain service via the communications device 63 acting as a relay, which communicates with the non-terrestrial network part 64.

A challenge of conventional cellular communications techniques may be the relatively high rate at which cell changes occur for the communications device 63 obtaining service from one or more non-terrestrial network parts. For example, where the non-terrestrial network part 64 is mounted on a LEO satellite, the non-terrestrial network part 64 may complete an orbit of the Earth in around 90 minutes; the coverage of a cell generated by the non-terrestrial network part 64 will move very rapidly, with respect to a fixed observation point on the surface of the Earth. Similarly, it may be expected in some cases that the communications device 63 may be mounted on an airborne vehicle itself, having a ground speed of several hundreds of kilometres per hour.

A study has been completed by 3GPP on solutions for NR to support NTN, as detailed in [3]. This study [3] focuses on use cases for satellite access in 5G and service requirements, as well as on evaluating solutions and impacts on RAN protocols and architecture. The study resulted in a new work item [4] that has already been started in RAN working groups to specify the enhancements identified for NR, especially for satellite access via transparent payload LEO and GEO satellites with implicit compatibility to support high altitude platform stations (HAPS) and air to ground (ATG) scenarios.

In addition, 3GPP initiated a new study item [5] for deploying narrowband internet of things (NB-IoT)/enhanced machine type communications (eMTC) over NTN, with the following justifications as detailed in [5]:

- IoT operation is critical in remote areas with low/no cellular connectivity for many different industries, including for example:
  - Transportation (maritime, road, rail, air) & logistics;
  - Solar, oil & gas harvesting;
  - Utilities;
  - Farming;
  - Environment monitoring; and
  - Mining etc.; and
- From the objectives perspective, at least the following items are addressed in [5]:
  - Aspects related to random access procedure/signals [RAN1, RAN2];
  - Mechanisms for time/frequency adjustment including Timing Advance, and UL frequency compensation indication [RAN1, RAN2];
  - Timing offset related to scheduling and hybrid automatic repeat request acknowledgement (HARQ-ACK) feedback [RAN1, RAN2];
  - Aspects related to HARQ operation [RAN2, RAN1];
  - General aspects related to timers (e.g. scheduling requests (SR), discontinuous reception (DRX), etc.) [RAN2];
  - RAN2 aspects related to idle mode and connected mode mobility [RAN2];
    - Radio link failure (RLF)-based for NB-IoT;
    - Handover-based for eMTC;
  - System information enhancements [RAN2]; and
  - Tracking area enhancements [RAN2].

An outline of studies by 3GPP into how to adapt Rel-16 NB-IoT and eMTC for operation over NTN can be found in [6]. The benefits of ubiquitous coverage are key for wide area IoT services. The study resulted in a new work item on IoT NTN [7], that has already been started in RAN working groups, to specify the enhancements identified for NB-IoT and eMTC, especially for satellite access via transparent payload LEO and GEO satellites with implicit compatibility to support high altitude platform stations (HAPS) and air to ground (ATG) scenarios.

In order for a UE to transmit uplink data to the network (e.g. on a Physical Uplink Control Channel (PUCCH) or a Physical Uplink Shared Channel (PUSCH)) it must first ensure it is synchronised with the network on the uplink. Since a particular eNB or gNB expects to be receiving communications from many UEs, it needs to ensure that it shares a common timing understanding with each of these UEs (i.e. they are synchronised in terms of the starting times of frames and Orthogonal Frequency Division Multiplexed (OFDM) symbols). This is so that the eNB is able to schedule communication with each of them in a manner that avoids collisions and to ensure orthogonality of the uplink signals, such that inter-subcarrier interference is avoided or mitigated. To ease the acquisition and maintenance of UL synchronisation, UEs require three sets of information:

- The UE's location on Earth—this can be measured by a Global Navigation Satellite System (GNSS) if the UE is equipped with such a GNSS. A moving UE will have to at some point carry out a new GNSS location fix, since its location on Earth will have changed since it was last measured;
- The serving satellite's position—this can be delivered to the UE via broadcast DL information, such as by system information. On the other hand, if the serving satellite's ephemeris information—that describes the orbital movement of the satellite from which the satellite's position at any time can be derived—is delivered to the UE, then the UE can use this ephemeris information to calculate the satellite location and speed at any given time; and
- Some timing parameters such as those relating to the distance of the base station from the satellite, and some frequency parameters such as those relating to the Doppler shift due to the orbital movement of the satellite.

It has been agreed within the RAN1 group of 3GPP that the ephemeris shall be broadcast to UEs via system information (SI). The detailed orbit of a satellite is not however predictable long-term, since the satellite's orbit will be elliptical rather than circular and can change due to unforeseen events. This means that the ephemeris information of the satellite has a particular life-span, and so must be updated at regular intervals. Once established for a given cell, system information is repeated at regular intervals-notwithstanding that some system information can be delivered to specific UEs on-demand. The repetition of SI allows any UE to decode the SI from the DL signal whenever it needs it. In current LTE and 5G, SI is expected to change after a maximum of 3 hours. When the SI changes, there are many mechanisms to notify the UE that the SI has changed. So a UE, having received notification that the SI has changed, would re-read the SI when it needs to configure anything in accordance with an SI parameter. In other words, according to known implementations, a UE-having read the SI once, for example during initial access—is not expected to read the SI again unless it has received notification that the SI has changed—for example, the SI validity time of 3 hours has expired. This helps the UE to save battery power.

In NTN, the ephemeris information is repeatedly broadcast within SI for any UE in need of the information to read. Since the ephemeris information becomes stale and needs to be updated, it is useful for a UE that reads the information to also know how long the information read will remain valid. This validity time may or may not be shorter than the 3 hours validity time of the SI depending on the satellite orbit. This is especially useful to RRC-IDLE and RRC-INACTIVE mode UEs, so that they are able to avoid having to re-read the SI to ensure that the ephemeris information they store is still valid.

In co-pending European patent application number EP21200375.0 [8], the contents of which are hereby incorporated by reference, it is defined how the UE can initialise a validity timer that counts down the validity duration of the current ephemeris information once it is read. In RRC-CONNECTED mode, the UE can maintain UL synchronisation as long as the ephemeris validity timer has not expired (and thus the ephemeris information has not changed). If the ephemeris validity timer expires before the UE has acquired new ephemeris information, then the UE would be said to have lost UL synchronisation. Loss of UL synchronisation means that the UE can no longer transmit in the UL until it regains UL synchronisation, which is not desirable, particularly for UEs which transmit time-critical uplink data. The UE can regain UL synchronisation by acquiring the new ephemeris and other UL synchronisation information.

An RRC-CONNECTED UE whose ephemeris validity timer is about to expire can, in accordance with embodiments of the present technique, declare an imminent loss of UL synchronisation (LULS) status, and then initiate an UL synchronisation recovery procedure during the period of time before UL synchronisation is lost (i.e. before the validity timer has expired). One action that the UE can undertake after declaring imminent LULS status is for the UE to declare radio link failure (RLF). This allows the UE to engage in a radio link recovery procedure to regain UL synchronisation. Traditionally however, RLF is declared when DL synchronisation is lost, unlike in the case described above in which the DL synchronisation may be maintained whilst it is the UL synchronisation which is lost.

Some problems relating to how a CONNECTED mode UE whose ephemeris validity timer is about to expire can declare an imminent loss of UL synchronisation (LULS) status include:

- How does the UE acquire the new ephemeris information? If the ephemeris validity timer is about to expire, then the current ephemeris information is still (for a short while longer) valid, and so the UE cannot just read the SI as it will indicate the same current ephemeris information rather than the new ephemeris information. On the other hand, the UE cannot wait until the timer has expired so that it is able to read the SI and acquire the new ephemeris information, as this will mean that it has lost UL synchronisation, and also will prevent the UE from initiating transmissions which may not be completed until after the validity timer expires, thus wasting resource unnecessarily;
- During the time that the UE cannot transmit on the UL, how does the gNB know not to schedule any UL transmissions for the UE? Besides the potential to cause interference to other UEs by transmitting in an unsynchronized manner, such transmissions may not be able to be completed before the UE loses UL synchronisation, and therefore both the waiting for the SI to update and the attempted transmission of data for which transmission will not be completed before the UE loses UL synchronisation represent both wasted time and uplink resources; and
- How does the UE regain UL synchronisation after acquiring the new ephemeris information?

Such issues are currently under discussion within 3GPP, but have not yet been addressed. Embodiments of the present disclosure provide solutions to such problems, and more generally, provide solutions to the overall problem of how the UE can indicate an imminent LULS to the network so as to buy time to regain UL synchronisation.

UL Synchronisation Recovery in NTN

Figure 7:
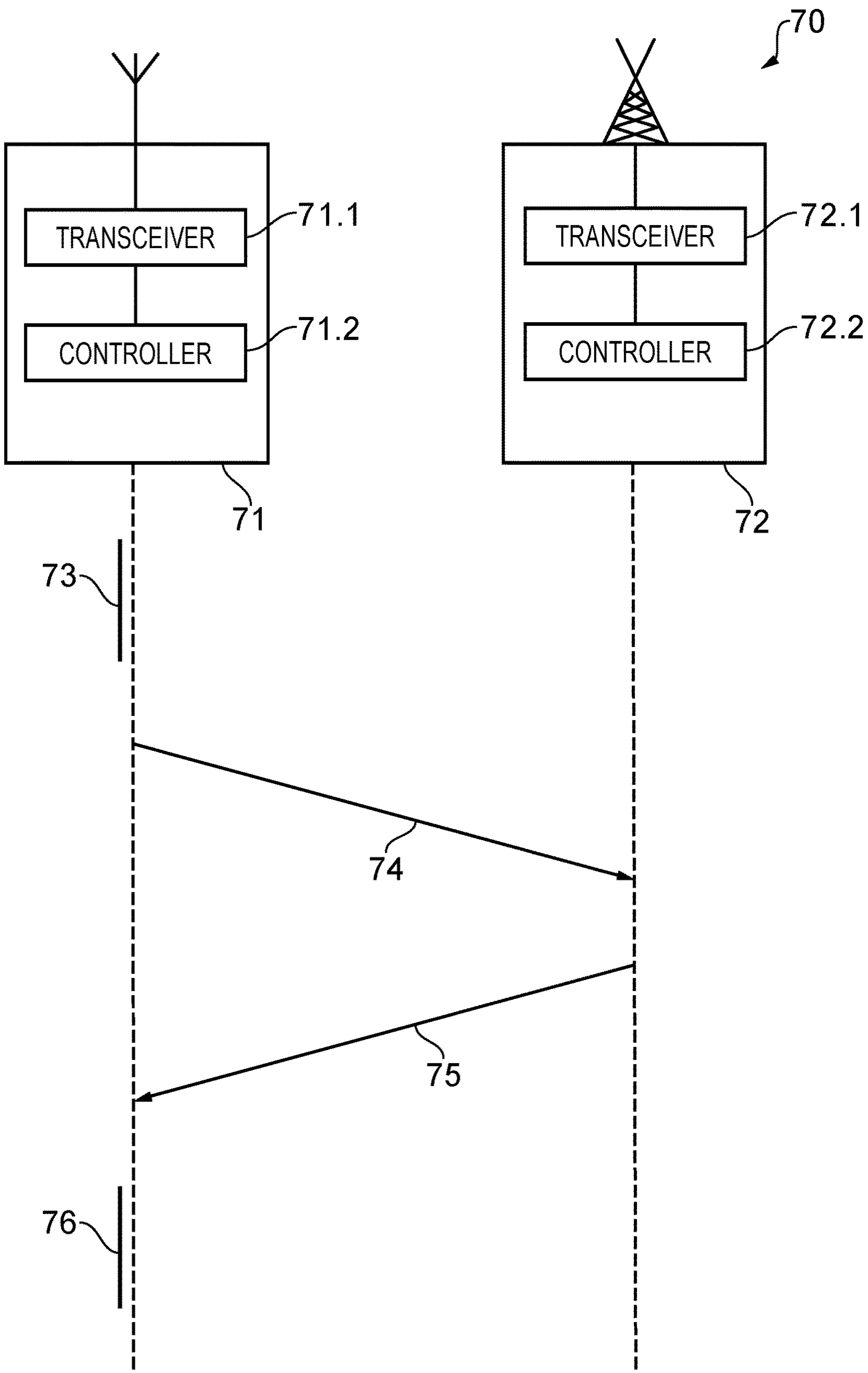
FIG. 7 is a part schematic, part message flow diagram representation of a wireless communications network comprising a communications device and infrastructure equipment in accordance with embodiments of the present technique.

FIG. 7 shows schematic representation of a wireless communications system 70 comprising a communications device 71 and a non-terrestrial network apparatus 72 forming part of a wireless communications network. The communications device 71 is configured to transmit signals to and/or to receive signals from the non-terrestrial network apparatus 72. The non-terrestrial network apparatus 72 (which may correspond to non-terrestrial network part 64 of the example wireless communications system of FIG. 6) may be a satellite, an airborne vehicle, an aerial platform, or the like, or may alternatively be mounted upon a satellite, an airborne vehicle, an aerial platform, or the like. Furthermore, the non-terrestrial network apparatus 72 may be an infrastructure equipment (e.g. a gNB or base station) of the wireless communications network—i.e. the non-terrestrial network apparatus 72 may implement functionality of a base station or gNB or the like. Alternatively, such an infrastructure equipment may be mounted upon or otherwise coupled to or carried by the non-terrestrial network apparatus 72. Alternatively, the non-terrestrial network apparatus 72 may relay signals between the communications device 71 and an infrastructure equipment, where such an infrastructure equipment may be a terrestrial (ground-based) infrastructure equipment-here, the non-terrestrial network apparatus 72 may act like a bent pipe as discussed above with respect to FIG. 4, in that the signals are reflected by the non-terrestrial network apparatus 72 between the ground-based infrastructure equipment and the communications device 71 with changed frequency or amplification. The communications device 71 and non-terrestrial network apparatus 72 each comprise a transceiver (or transceiver circuitry) 71.1, 72.1 and a controller (or controller circuitry) 71.2, 72.2. Each of the controllers 71.2, 72.2 may be, for example, a microprocessor, a CPU, or a dedicated chipset, etc. The transceivers (or transceiver circuitry) 71.1, 72.1 of one or both of the communications device 71 and non-terrestrial network apparatus 72 may comprise both a transmitter and a receiver, or may—instead of being a transceiver—be a standalone transmitter and receiver pair. It would be appreciated by those skilled in the art that the non-terrestrial network apparatus 72 (as well as in some arrangements the communications device 71 and any other non-terrestrial network apparatus, infrastructure equipment, or communications devices operating in accordance with embodiments of the present technique) may comprise a plurality of (or at least, one or more) transceivers (or transceiver circuitry) 71.1, 72.1.

Specifically, as is shown by FIG. 7, the transceiver circuitry 71.1 and the controller circuitry 71.2 of the communications device 71 are configured in combination to determine 73 that the communications device 71 will lose uplink synchronisation with the wireless communications network at a first time, to transmit 74, to the non-terrestrial network apparatus 72 before the first time, an indication that the communications device 71 will lose uplink synchronisation with the wireless communications network (e.g. imminently), to receive 75, from the non-terrestrial network apparatus 72 before the first time and in response to the transmitted indication, a signal comprising information for use by the communications device 71 in re-acquiring uplink synchronisation with the wireless communications network until at least a second time (i.e. the communications device 71 may determine that it will be able to maintain uplink synchronisation with the wireless communications network until it reaches—at least—the second time), the second time being later than the first time, and to re-acquire 76, based at least in part on the received information 75, uplink synchronisation with the wireless communications network until the second time (it is preferable for the communications device 71 to re-acquire uplink synchronisation before the first time has been reached, so as the communications device 71 is able to maintain seamless uplink synchronisation with the wireless communications network. However, it should be appreciated that this will not always be the case, and the communications device 71 in some cases may not be able to re-acquire uplink synchronisation until after the first time—i.e. after uplink synchronisation has been lost).

Effectively, at least some embodiments of the present disclosure propose that a UE sends an "imminent LULS indication" to the network before UL synchronisation is lost, and that the UE receives information from the network that helps the UE re-acquire UL synchronisation and/or indicates how the UE should behave once it has re-acquired UL synchronisation. This is advantageous, because it may be possible that the UE can avoid losing UL synchronisation at all—for example, by re-acquiring UL synchronisation before such time that it is lost. This may help the UE avoid long periods of time and available resources in which it is not transmitting uplink data—particularly if it would otherwise have to wait for system information (such as ephemeris information) to be updated before it can initiate a long transmission that would not be completed until after UL synchronisation is lost and would therefore be necessarily retransmitted. Such advantages cannot be obtained through performing methods currently known in the art, where certain information like ephemeris information is only obtainable by UEs through reading broadcasted system information, where at least in non-terrestrial networks, system information is not provided to UEs on-demand. Indeed, some low-capability UEs are simply unable to read system information at all while in connected mode, and so embodiments of the present technique allow such UEs to operate more efficiently. Furthermore, embodiments of the present disclosure allow for a UE to operate more efficiently upon re-acquiring UL synchronisation; for example by defining how this UL synchronisation acquisition may be indicated to the network, how the UE may obtain certain updated information (such as ephemeris information), and/or how the UE's connection to the network may be configured going forwards.

The communications device/UE may determine that it will lose uplink synchronisation with the wireless communications network at the first time in any of a number of ways. For example, the communications device may determine that it will lose uplink synchronisation with the wireless communications network at the first time based on the first time being a first invalidity time associated with first motion information (e.g. ephemeris information) of the non-terrestrial network apparatus—that is, the communications device determines that the validity timer of the ephemeris information is about to expire (at the first (invalidity) time). Alternatively, or in combination with the above-described manner of the communications device determining that it will lose uplink synchronisation with the wireless communications network at the first time, the communications device may determine that it will lose uplink synchronisation with the wireless communications network at the first time based on receiving a paging message from the wireless communications network, the paging message indicating that first motion information (e.g. ephemeris information) of the non-terrestrial network apparatus known to the communications device is/is soon to be out of date and that second motion information (e.g. new ephemeris information) of the non-terrestrial network apparatus and a second invalidity time associated with the second motion information are available for acquisition by the communications device, wherein the first motion information and the second motion information are different, and wherein the second time is the second invalidity time. Here, as would be understood by those skilled in the art, the first invalidity time indicates the end of a (first) validity duration of the first motion information (e.g. first ephemeris information), and the second invalidity time indicates the end of a (second) validity duration of the second motion information (e.g. second, updated, ephemeris information). Alternatively, or in combination with one or more of the above-described manners of the communications device determining that it will lose uplink synchronisation with the wireless communications network at the first time, the communications device may be configured to determine that it will lose uplink synchronisation with the wireless communications network at the first time based on a velocity of the communications device being above a predefined threshold—for example, the communications device might detect that it will lose UL synchronisation with the non-terrestrial network apparatus at an earlier time than indicated by a network-configured validity timer due to the increased uncertainty in timing or Doppler frequency associated with a UE moving at a high, and potentially changing, velocity. Alternatively, or in combination with one or more of the above-described manners of the communications device determining that it will lose uplink synchronisation with the wireless communications network at the first time, the communications device may be configured to determine that it will lose uplink synchronisation with the wireless communications network at the first time based on the communications device determining that an internal oscillator of the communications device is functioning incorrectly—for example, a detected temperature of the oscillator may be above a certain threshold above which the communications device knows it will operate unreliably, where unreliable operation may be associated with the oscillator operating with a frequency error that is greater than a specified maximum frequency error.

In arrangements of embodiments of the present technique where the ephemeris information validity timer expiring is, partially or fully, the cause of the UE determining that it will lose uplink synchronisation with the wireless communications network, the communications device may indicate this to the network when transmitting the indication to the network that the communications device will lose uplink synchronisation with the wireless communications network, or may otherwise transmit a request for updated ephemeris information to the network. Accordingly, the network may respond with either an indication of the updated ephemeris information in a UE-specific manner, or may indicate to the communications device that the system information has been updated to indicate the new ephemeris information, and therefore may be read by the communications device in order to assist it in re-acquiring uplink synchronisation with the network. In other words, the information for use by the communications device in re-acquiring uplink synchronisation may comprise indications of the second motion information of the non-terrestrial network apparatus and the second invalidity time (and/or second validity duration of the second motion information). Alternatively, or in addition, the information for use by the communications device in re-acquiring uplink synchronisation may comprise an indication that the communications device is to read system information broadcast by the wireless communications network, the system information comprising indications of the second motion information of the non-terrestrial network apparatus and the second invalidity time (and/or second validity duration of the second motion information), and wherein the communications device is then configured to read the broadcasted system information.

In some arrangements of embodiments of the present technique, after sending the imminent LULS indication the UE will engage a modified radio link failure (RLF) recovery procedure. In other words, the communications device may be configured to perform, following transmission of the indication that the communications device will lose uplink synchronisation with the wireless communications network imminently, a radio link failure, RLF, procedure, wherein the RLF procedure comprises the communications device receiving the signal comprising information for use by the communications device in re-acquiring uplink synchronisation and the communications device re-acquiring uplink synchronisation.

In some arrangements of embodiments of the present technique, the indication can be implemented by the UE initiating a RACH procedure (by transmitting a Msg1) using one of a designated set of preambles reserved for the purpose. In other words, the indication that the communications device will lose uplink synchronisation with the wireless communications network may be transmitted within a random access (RACH) procedure message. Here, the RACH procedure message may comprise one of a preconfigured set of preambles, the preconfigured set of preambles being specific for the purpose of indicating that the communications device will lose uplink synchronisation with the wireless communications network. By using one of a designated set of preambles reserved for the purpose of providing the indication, the eNodeB can be made aware at an early time that the UE will be sending an imminent LULS indication. The eNodeB may then prioritise the message sequence exchange associated with the imminent LULS indication over message exchanges with UEs that are not about to suffer imminent LULS.

On receiving this Msg1, the base station proceeds through the normal RACH procedure until it receives a Msg3 of the RACH procedure which may carry (a) the UE identity information such as its C-RNTI and/or (b) an ephemeris information request. This can be transmitted for example as an RRC Connection Request or RRC Resume message, or as UE Assistance Information or a new RRC message using either the Dedicated Control Channel (DCCH) or Common Control Channel (CCCH) logical channel. In response to the Msg3, the base station will send a Msg4 via which it may resolve any contention and assign contention-free random access (CFRA) resources to the UE. This Msg4 can also contain other information as to how the UE should behave once it re-acquires UL synchronisation. On receiving acknowledgement of this Msg4, the network would assume that the UE UL has failed (or will imminently fail) and will stop scheduling any UL data or measurements to the UE until after the network is certain that the UE has acquired new ephemeris information and regained UL synchronisation. The UE therefore has to declare imminent LULS status in advance of UL synchronisation loss with enough time to execute all this recovery procedure right up to the transmission of the HARQ-ACK of the Msg4 before the ephemeris validity timer expires.

Alternatively, a 2-step RACH procedure may be performed whereby the UE sends MsgA with either a randomly selected preamble or a preamble pre-allocated for requesting the updated ephemeris information. The network then responds by sending MsgB with new timing information and an indication of how the UE can obtain updated ephemeris information for example, by re-acquiring the SIB carrying this ephemeris information. Since the UE remains DL synchronized, the UE is able to read the system information if the network updates the system information with, for example, the new ephemeris information.

In other arrangements of embodiments of the present technique, the report of imminent LULS status can be implemented by sending an RRC message before LULS. In other words, the indication that the communications device will lose uplink synchronisation with the wireless communications network is transmitted within a radio resource control (RRC) message.

This RRC message does not necessarily have to be sent as part of a RACH procedure. For example, the UE can send a scheduling request message to the eNB/gNB for resources and be scheduled a PUSCH within which the UE can transmit an RRC message. In other words, prior to transmitting the RRC message comprising the indication that the communications device will lose uplink synchronisation with the wireless communications network imminently, the communications device may be configured to transmit, to the non-terrestrial network apparatus, a request for uplink resources, to receive, from the non-terrestrial network apparatus, an indication of uplink resources for transmission of the RRC message by the communications device, and to transmit, to the non-terrestrial network apparatus within the indicated uplink resources, the RRC message comprising the indication that the communications device will lose uplink synchronisation with the wireless communications network and/or a request for ephemeris information.

The RRC message can be, for example, an RRC Connection Request, or an RRC Resume message. This RRC message could also be a UE Assistance Information, or a new RRC message containing an ephemeris information request, or furthermore a new RRC message indicating imminent LULS. The eNB/gNB can respond to the UE with an RRC response message, where this response message can indicate to the UE how the UE should behave once it has re-acquired UL synchronization or it can indicate how the UE can acquire updated ephemeris information. For example, in at least some arrangements of embodiments of the present disclosure:

- The UE can receive from the network the updated ephemeris information in an RRC response message or a message directing the UE that ephemeris system information has been updated in SI. The UE can then read the SIB containing the ephemeris information. The network knows when the next transmission of the ephemeris information will take place on the SIB, and so can expect that the UE has read it once it has been transmitted. Hence, the network can understand when the UE will have re-acquired UL synchronization (i.e. after the SIB containing the ephemeris information has been transmitted)—in other words, the non-terrestrial network apparatus may be configured to determine, based on transmitting the information for use by the communications device in re-acquiring uplink synchronisation (which may for example either comprise a UE-specific indication of the ephemeris information or an indication that the communications device is to re-read system information broadcast by the network to obtain the new ephemeris information), that the communications device has re-acquired uplink synchronisation with the wireless communications network;
- The UE can be assigned some CFRA resources to indicate to the eNB/gNB that it has re-acquired UL synchronisation—in other words, the information for use by the communications device in re-acquiring uplink synchronisation may comprise an indication of uplink resources, and wherein the communications device is configured to transmit, to the non-terrestrial network apparatus within the indicated uplink resources after re-acquiring uplink synchronisation, an indication that the communications device has re-acquired uplink synchronisation with the wireless communications network;
- The UE can be instructed to terminate the RRC connection and to perform initial access with the eNB/gNB after it has re-acquired UL synchronisation—in other words, the information for use by the communications device in re-acquiring uplink synchronisation may comprise an indication that the communications device is to transition from a connected mode with the wireless communications network in which the communications device is currently operating into one of an idle mode and/or an inactive mode, and wherein the communications device is configured to transition from the connected mode into the idle mode or the inactive mode.

Furthermore, the information for use by the communications device in re-acquiring uplink synchronisation may comprise an indication that the communications device, following transitioning from the connected mode, is to perform an initial access procedure with the wireless communications network so as to transition back to the connected mode, and wherein the communications device is configured to perform the initial access procedure with the wireless communications network to transition back into the connected mode; and/or.

The UE can be instructed to acquire the SIB used to carry the ephemeris information (SIB-EPH) and to re-acquire UL synchronisation with another cell, where this other cell may only become active in the future (e.g. when a different satellite associated with that other cell passes overhead).

Those skilled in the art would appreciate that the above-described UE-behaviour indicated to the UE by the network following the UE having re-acquired UL synchronisation may not necessarily be indicated within an RRC message, but may be indicated by any suitable means; for example, dedicated downlink control signalling, medium access control (MAC) signalling, paging, via system information, or the like.

After acknowledging reception of Msg4/MsgB (or receiving some other DL indication from the eNB/gNB), the UE may try to access new ephemeris information. After acquiring the new ephemeris information, the UE can recalculate its timing advance, Doppler frequency, etc. (e.g. based on the UE's knowledge of its own position and velocity and optionally in combination with the newly acquired ephemeris information, where this new ephemeris information may be used to determine locations and velocities of the satellite at various times) thereby regaining UL synchronisation. In other words, the step of re-acquiring uplink synchronisation comprises one or more of, at the communications device, determining or using a location of the communications device, determining a velocity of the communications device, receiving motion (e.g. ephemeris) information of the non-terrestrial network apparatus, determining a location of the non-terrestrial network apparatus, determining a velocity of the non-terrestrial network apparatus, performing a recalculation of a timing advance of the communications device, and performing a recalculation of a Doppler frequency of the communications device with respect to the non-terrestrial network apparatus. Here, the communications device may be configured to determine at least one of the location of the non-terrestrial network apparatus and the velocity of the non-terrestrial network apparatus based on the second motion information. With UL synchronisation regained, the UE sends a PRACH using the assigned CFRA preamble or other UL message to inform the network that it has regained UL synchronisation.

The UE may not have to send PRACH after re-acquiring UL synchronisation. For example, the eNB/gNB can wait for a time that it deems to be sufficient to allow the UE to re-acquire UL synchronisation and then directly schedule the UE in the DL.

If the UE responds to the DL transmission (e.g. PDCCH scheduling PDSCH, which would be associated with a PUCCH), the eNB/gNB will know that the UE has acquired UL synchronisation once it receives the PUCCH; and The eNB/gNB can send a PDCCH order to the UE, requesting the UE to send a PRACH. Upon reading the PRACH, the eNB/gNB can understand that the UE has acquired UL synchronisation (if the UE did not have UL synchronisation, it would not have been able to send the PRACH).

In other words, the infrastructure equipment may be configured to wait until a third time following the step of transmitting the signal comprising information for use by the communications device in re-acquiring uplink synchronisation, the third time being a time by which the infrastructure equipment determines that the communications device has re-acquired uplink synchronisation, to transmit, to the communications device via the non-terrestrial network apparatus at the third time, a downlink signal, to receive, from the communications device via the non-terrestrial network apparatus, an uplink signal in response to the transmitted downlink signal, and to determine, based on the received uplink signal, that the communications device has re-acquired uplink synchronisation.

In some arrangements of embodiments of the present technique, when the ephemeris validity timer at the network expires, the network shall start to broadcast new ephemeris information in the SIB used to carry the ephemeris (SIB-EPH). In other words, the infrastructure equipment may be configured to determine that the first invalidity time has been reached, and to broadcast system information comprising indications of the second motion information of the non-terrestrial network apparatus and the second invalidity time (and/or second validity duration of the second motion information). Any UE that recently declared imminent LULS can then read the new ephemeris from SIB-EPH shortly after its own ephemeris validity timer expires. After reading the ephemeris, the UE can inform the network that it has regained UL synchronisation through any of the aforementioned means. The base station knows that the UE has acquired new ephemeris information when, after it starts to broadcast a new SIB-EPH, it receives such notification from the UE. Effectively, any UE whose ephemeris validity timer expires before it has initiated or completed the procedure to regain UL synchronisation, simply re-reads SIB-EPH for the new ephemeris information. UEs that initiated the procedure have the added obligation to inform the network either via RACH that may or may not use pre-assigned CFRA resources or other RRC signaling that they have regained UL synchronisation.

The network may page UEs to indicate that a new SIB-EPH is available. The paging message may indicate that the reason to re-read SIB is that new SIB-EPH is available. In other words, the infrastructure equipment may be configured to determine that the first invalidity time has been reached, and to transmit paging information to the communications device, the paging information comprising an indication that the second motion information of the non-terrestrial network apparatus and the second invalidity time (and/or second validity duration of the second motion information) are available for acquisition by the communications device. Those UEs that are about to lose UL synchronisation can read the SIB-EPH. In contrast, those UEs that still have time remaining on their UL synchronisation validity timers can ignore the updated SIB-EPH, and rely on the ephemeris information that they already have stored.

In response to receiving an ephemeris information request, for example via an RRC message such as an RRC connection request, an RRC Resume message, a UE report using UE Assistance information, or a new RRC message (which may be included within the UE's LULS indication message or may be separate to the UE's LULS indication), the eNB/gNB can either:

- Send updated ephemeris information in a UE-specific manner; or
- Send updated ephemeris information via broadcast signaling, for example by sending a paging message indicating that SIB-EPH has been updated.

In some arrangements of embodiments of the present technique, after receiving Msg3 (or an RRC message that is not necessarily associated with a RACH procedure), or MsgA (in case of 2-step RACH) from the UE with the ephemeris information request, the network schedules and transmits the new ephemeris information to the UE in a UE-specific manner. This can be very useful in cases where the UE declared imminent LULS status whilst the ephemeris validity timer still had a long time to expire so that by the time of reception of the declaration by the network, the ephemeris validity timer still has a relatively long time before reset. This case can happen, for example, if a UE knows that the current ephemeris information will expire before the end of a long UL transmission. Then instead of initiating a transmission that would have to be aborted before the end because of ephemeris expiry and consequent loss of UL synchronisation, the UE declares imminent LULS status and saves wasting power in a doomed transmission.

In other words, the communications device may be configured to determine that the communications device has uplink data to transmit to the wireless communications network, to determine that a period required for transmitting the uplink data is longer than a remaining period until the first time, and subsequently, to transmit the indication that the communications device will lose uplink synchronisation with the wireless communications network. An example of such a long transmission is the transmission of a PUSCH in poor coverage, for example due to large pathloss between the UE and satellite, which can involve as many as 1024 repetitions of a PUSCH. In such arrangements, there could be a flag in the Msg3/MsgA (or an RRC message that is not necessarily associated with a RACH procedure) informing the network that the UE is ready for UE-specific delivery of the ephemeris information.

If the network receives more than a certain number of imminent LULS indications from UEs during one ephemeris validity period, this may indicate that immediately after the new ephemeris is broadcast, many UEs will send resource requests to seek UL resources for transmission, for example by sending a PRACH, and so cause congestion. In other words, the infrastructure equipment may be configured to receive, from each of one or more other communications devices via the non-terrestrial network apparatus before the first time, an indication that the each of the one or more other communications devices will lose uplink synchronisation with the wireless communications network.

In some arrangements of embodiments of the present technique, knowing this, the eNB/gNB will in Msg4/MsgB (or an RRC message that is not necessarily associated with a RACH procedure) send a different back-off to each of the UEs. The back-off could be based on the ephemeris validity timer state after which the UE is allowed to transmit in the UL. The back-off would hence ensure that UEs attempt their first UL transmissions to the network after regaining UL synchronisation at different times after the new SIB-EPH is transmitted. In other words, the infrastructure equipment may be configured to determine if the number of the communications device and the one or more other communications devices is above a predefined threshold, and to transmit, if it is determined that the number of the communications device and the one or more other communications devices is above the predefined threshold, different back-off times to each of the communications device and the one or more other communications devices via the non-terrestrial network apparatus, wherein the different back-off times indicate a period during which the each of the communications device and the one or more other communications devices is not allowed to transmit signals to the wireless communications network.

After transmission of the new SIB-EPH, many UEs may simultaneously want to inform the network that they have re-acquired UL synchronization by sending PRACH. This can cause PRACH congestion on the network. In order to control this congestion, the network can assign some PRACH resources to be used for signalling that UL synchronisation has been re-acquired. These PRACH resources can be CFRA resources or contention-based resources. These PRACH resources can be distinct to PRACH resources used by other UEs for initial access (or other non-LULS purposes). When the eNB/gNB receives a PRACH from this set of assigned resources, it can, in accordance with embodiments of the present technique, either:

- Respond with signalling, for example assisting the UE to obtain updated ephemeris information as described above and/or providing resources for the UE to indicate when it has re-acquired UL synchronisation, to enable the continuation/re-starting the RRC connection that the UE had before LULS; and/or
- Prioritise UEs. For example, the network may prioritise UEs in a LULS procedure over other UEs that are making an initial connection to the network. The eNB/gNB may make this prioritization decision to try to complete communication from these UEs before an application timer expires.

In other words, the infrastructure equipment may be configured, in response to receiving the indication that the communications device has re-acquired uplink synchronisation with the wireless communications network, to transmit, to the communications device via the non-terrestrial network apparatus, signalling indicating that the communications device should either continue or-restart communications with the wireless communications network. Alternatively, or in addition, the infrastructure equipment may be configured, in response to receiving the indication that the communications device has re-acquired uplink synchronisation with the wireless communications network, to determine that the infrastructure equipment is to prioritise further communications with the communications device over communications with other communications devices which are currently not operating in a connected mode with the wireless communications network.

In other arrangements of embodiments of the present technique, to reduce the likely congestion immediately after the new ephemeris is broadcast, the base station can select some UEs to which it schedules and transmits the new ephemeris information in a UE-specific manner. One means of doing this selection, is for the base station to take into account the time at which it received the imminent LULS status from each UE and schedule new ephemeris information to UEs with the earliest declaration of imminent LULS status. In other words, the infrastructure equipment may be configured to transmit, to each of the communications device and the one or more other communications devices via the non-terrestrial network apparatus in the same temporal order in which each of the indications were received, a signal comprising information for use by the each of the communications device and the one or more other communications devices in re-acquiring uplink synchronisation with the wireless communications network until at least the second time (e.g. by re-acquiring uplink synchronisation with the wireless communications network by using ephemeris information of the non-terrestrial network apparatus that is valid until at least the second time).

Figure 8:
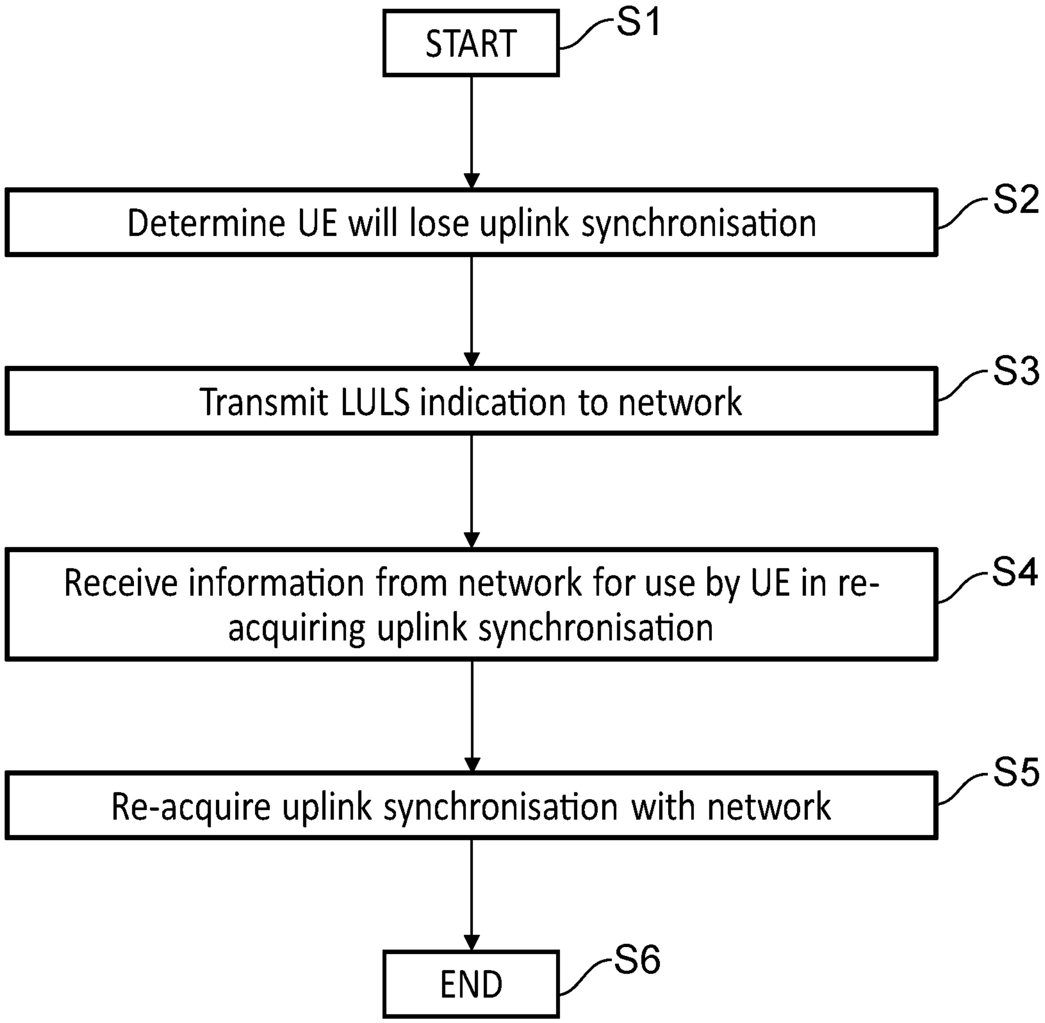
FIG. 8 shows a flow diagram illustrating a process of communications in a communications system in accordance with embodiments of the present technique.

FIG. 8 shows a flow diagram illustrating a first example process of communications in a communications system in accordance with embodiments of the present technique. The process shown by FIG. 8 is a method of operating a communications device for transmitting signals to and/or receiving signals from a non-terrestrial network apparatus of a wireless communications network.

The method begins in step S1. The method comprises, in step S2, determining that the communications device will lose uplink synchronisation with the wireless communications network at a first time. In step S3, the process comprises transmitting, to the non-terrestrial network apparatus before the first time, an indication that the communications device will lose uplink synchronisation with the wireless communications network. The method then comprises, in step S4, receiving, from the non-terrestrial network apparatus before the first time and in response to the transmitted indication, a signal comprising information for use by the communications device in re-acquiring uplink synchronisation with the wireless communications network until at least a second time, the second time being later than the first time. In step S5, the process comprises re-acquiring, based at least in part on the received information, uplink synchronisation with the wireless communications network until the second time. The process ends in step S6.

Those skilled in the art would appreciate that the method shown by FIG. 8 may be adapted in accordance with embodiments of the present technique. For example, other intermediate steps may be included in the method, or the steps may be performed in any logical order. Furthermore, though embodiments of the present technique have been described largely by way of the example communications system shown in FIG. 7, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting signals to and/or receiving signals from a non-terrestrial network apparatus of a wireless communications network, the method comprising
- determining that the communications device will lose uplink synchronisation with the wireless communications network at a first time,
- transmitting, to the non-terrestrial network apparatus before the first time, an indication that the communications device will lose uplink synchronisation with the wireless communications network,
- receiving, from the non-terrestrial network apparatus before the first time and in response to the transmitted indication, a signal comprising information for use by the communications device in re-acquiring uplink synchronisation with the wireless communications network until at least a second time, the second time being later than the first time, and
- re-acquiring, based at least in part on the received information, uplink synchronisation with the wireless communications network until the second time.

Paragraph 2. A method according to Paragraph 1, wherein the step of re-acquiring uplink synchronisation with the wireless communications network until the second time is performed before the first time.

Paragraph 3. A method according to Paragraph 1 or Paragraph 2, comprising
- performing, following transmission of the indication that the communications device will lose uplink synchronisation with the wireless communications network, a radio link failure, RLF, procedure,
- wherein the RLF procedure comprises the step of receiving the signal comprising information for use by the communications device in re-acquiring uplink synchronisation and the step of re-acquiring uplink synchronisation.

Paragraph 4. A method according to any of Paragraphs 1 to 3, wherein the indication that the communications device will lose uplink synchronisation with the wireless communications network is transmitted within a random access, RACH, procedure message.

Paragraph 5. A method according to Paragraph 4, wherein the RACH procedure message comprises one of a preconfigured set of preambles, the preconfigured set of preambles being specific for the purpose of indicating that the communications device will lose uplink synchronisation with the wireless communications network.

Paragraph 6. A method according to any of Paragraphs 1 to 5, wherein the indication that the communications device will lose uplink synchronisation with the wireless communications network is transmitted within a radio resource control, RRC, message.

Paragraph 7. A method according to Paragraph 6, wherein, prior to transmitting the RRC message comprising the indication that the communications device will lose uplink synchronisation with the wireless communications network, the method comprises
- transmitting, to the non-terrestrial network apparatus, a request for uplink resources,
- receiving, from the non-terrestrial network apparatus, an indication of uplink resources for transmission of the RRC message by the communications device, and
- transmitting, to the non-terrestrial network apparatus within the indicated uplink resources, the RRC message comprising the indication that the communications device will lose uplink synchronisation with the wireless communications network.

Paragraph 8. A method according to any of Paragraphs 1 to 7, wherein the step of re-acquiring uplink synchronisation comprises one or more of:
- determining a location of the communications device,
- determining a velocity of the communications device,
- receiving ephemeris information of the non-terrestrial network apparatus,
- determining a location of the non-terrestrial network apparatus,
- determining a velocity of the non-terrestrial network apparatus,
- performing a recalculation of a timing advance of the communications device, and performing a recalculation of a Doppler frequency of the communications device with respect to the non-terrestrial network apparatus.

Paragraph 9. A method according to any of Paragraphs 1 to 8, wherein the information for use by the communications device in re-acquiring uplink synchronisation comprises an indication of uplink resources, and wherein the method comprises transmitting, to the non-terrestrial network apparatus within the indicated uplink resources after re-acquiring uplink synchronisation, an indication that the communications device has re-acquired uplink synchronisation with the wireless communications network.

Paragraph 10. A method according to any of Paragraphs 1 to 9, wherein the information for use by the communications device in re-acquiring uplink synchronisation comprises an indication that the communications device is to transition from a connected mode with the wireless communications network in which the communications device is currently operating in into one of an idle mode and an inactive mode, and wherein the method comprises transitioning from the connected mode into the idle mode or the inactive mode.

Paragraph 11. A method according to Paragraph 10, wherein the information for use by the communications device in re-acquiring uplink synchronisation comprises an indication that the communications device, following transitioning from the connected mode, is to perform an initial access procedure with the wireless communications network so as to transition back to the connected mode, and wherein the method comprises performing the initial access procedure with the wireless communications network to transition back into the connected mode.

Paragraph 12. A method according to any of Paragraphs 1 to 11, wherein the first time is a first invalidity time associated with first motion information of the non-terrestrial network apparatus, and the second time is a second invalidity time associated with second motion information of the non-terrestrial network apparatus, wherein the first motion information and the second motion information are different.

Paragraph 13. A method according to Paragraph 12, wherein the information for use by the communications device in re-acquiring uplink synchronisation comprises indications of the second motion information of the non-terrestrial network apparatus and the second invalidity time.

Paragraph 14. A method according to Paragraph 12 or Paragraph 13, wherein the information for use by the communications device in re-acquiring uplink synchronisation comprises an indication that the communications device is to read system information broadcast by the wireless communications network, the system information comprising indications of the second motion information of the non-terrestrial network apparatus and the second invalidity time, and wherein the method comprises reading the broadcasted system information.

Paragraph 15. A method according to any of Paragraphs 12 to 14, wherein the step of re-acquiring uplink synchronisation comprises one or more of:

determining a location of the communications device,
determining a velocity of the communications device,
determining a location of the non-terrestrial network apparatus,
determining a velocity of the non-terrestrial network apparatus,
performing a recalculation of a timing advance of the communications device, and
performing a recalculation of a Doppler frequency of the communications device with respect to the non-terrestrial network apparatus, wherein the communications device determines at least one of the location of the non-terrestrial network apparatus and the velocity of the non-terrestrial network apparatus based on the second motion information.

Paragraph 16. A method according to any of Paragraphs 1 to 15, wherein the communications device determines that it will lose uplink synchronisation with the wireless communications network at the first time based on the first time being a first invalidity time associated with first motion information of the non-terrestrial network apparatus.

Paragraph 17. A method according to any of Paragraphs 1 to 16, wherein the communications device determines that it will lose uplink synchronisation with the wireless communications network at the first time based on receiving a paging message from the wireless communications network, the paging message indicating that first motion information of the non-terrestrial network apparatus known to the communications device is out of date and that second motion information of the non-terrestrial network apparatus and a second invalidity time are available for acquisition by the communications device, wherein the first motion information and the second motion information are different, and wherein the second time is the second invalidity time.

Paragraph 18. A method according to any of Paragraphs 1 to 17, wherein the communications device determines that it will lose uplink synchronisation with the wireless communications network at the first time based on a velocity of the communications device being above a predefined threshold.

Paragraph 19. A method according to any of Paragraphs 1 to 18, wherein the communications device determines that it will lose uplink synchronisation with the wireless communications network at the first time based on the communications device determining that an internal oscillator of the communications device is functioning incorrectly.

Paragraph 20. A method according to any of Paragraphs 1 to 19, wherein the step of transmitting the indication that the communications device will lose uplink synchronisation with the wireless communications network comprises determining that the communications device has uplink data to transmit to the wireless communications network, determining that a period required for transmitting the uplink data is longer than a remaining period until the first time, and subsequently, transmitting the indication that the communications device will lose uplink synchronisation with the wireless communications network.

Paragraph 21. A method according to any of Paragraphs 1 to 20, wherein the non-terrestrial network apparatus implements functionality of a base station.

Paragraph 22. A method according to any of Paragraphs 1 to 21, wherein a base station is mounted upon the non-terrestrial network apparatus.

Paragraph 23. A method according to any of Paragraphs 1 to 22, wherein the non-terrestrial network apparatus relays communications between the communications device and a ground-based base station.

Paragraph 24. A communications device comprising transceiver circuitry configured to transmit signals to and/or to receive signals from a non-terrestrial network apparatus of a wireless communications network, and controller circuitry configured in combination with the transceiver circuitry to determine that the communications device will lose uplink synchronisation with the wireless communications network at a first time, to transmit, to the non-terrestrial network apparatus before the first time, an indication that the communications device will lose uplink synchronisation with the wireless communications network, to receive, from the non-terrestrial network apparatus before the first time and in response to the transmitted indication, a signal comprising information for use by the communications device in re-acquiring uplink synchronisation with the wireless communications network until at least a second time, the second time being later than the first time, and to re-acquire, based at least in part on the received information, uplink synchronisation with the wireless communications network until the second time.

Paragraph 25. Circuitry for a communications device comprising transceiver circuitry configured to transmit signals to and/or to receive signals from a non-terrestrial network apparatus of a wireless communications network, and controller circuitry configured in combination with the transceiver circuitry to determine that the communications device will lose uplink synchronisation with the wireless communications network at a first time, to transmit, to the non-terrestrial network apparatus before the first time, an indication that the communications device will lose uplink synchronisation with the wireless communications network, to receive, from the non-terrestrial network apparatus before the first time and in response to the transmitted indication, a signal comprising information for use by the communications device in re-acquiring uplink synchronisation with the wireless communications network until at least a second time, the second time being later than the first time, and to re-acquire, based at least in part on the received information, uplink synchronisation with the wireless communications network until the second time.

Paragraph 26. A method of operating an infrastructure equipment forming part of a wireless communications network for transmitting signals to and/or receiving signals from a communications device via a non-terrestrial network apparatus of the wireless communications network, the method comprising receiving, from the communications device via the non-terrestrial network apparatus, an indication that the communications device will lose uplink synchronisation with the wireless communications network, and transmitting, to the communications device via the non-terrestrial network apparatus before a first time at which the communications device will lose uplink synchronisation with the wireless communications network and in response to the received indication, a signal comprising information for use by the communications device in re-acquiring uplink synchronisation with the wireless communications network until at least a second time, the second time being later than the first time.

Paragraph 27. A method according to Paragraph 26, wherein the indication that the communications device will lose uplink synchronisation with the wireless communications network is received within a random access, RACH, procedure message.

Paragraph 28. A method according to Paragraph 27, wherein the RACH procedure message comprises one of a preconfigured set of preambles, the preconfigured set of preambles being specific for the purpose of indicating that the communications device will lose uplink synchronisation with the wireless communications network.

Paragraph 29. A method according to any of Paragraphs 26 to 28, wherein the indication that the communications device will lose uplink synchronisation with the wireless communications network is received within a radio resource control, RRC, message.

Paragraph 30. A method according to Paragraph 29, wherein, prior to receiving the RRC message comprising the indication that the communications device will lose uplink synchronisation with the wireless communications network, the method comprises receiving, from the communications device via the non-terrestrial network apparatus, a request for uplink resources, transmitting, to the communications device via the non-terrestrial network apparatus, an indication of uplink resources for transmission of the RRC message by the communications device, and receiving, from the communications device via the non-terrestrial network apparatus within the indicated uplink resources, the RRC message comprising the indication that the communications device will lose uplink synchronisation with the wireless communications network.

Paragraph 31. A method according to any of Paragraphs 26 to 30, wherein the information for use by the communications device in re-acquiring uplink synchronisation comprises an indication of uplink resources, and wherein the method comprises receiving, from the communications device via the non-terrestrial network apparatus within the indicated uplink resources after re-acquiring uplink synchronisation, an indication that the communications device has re-acquired uplink synchronisation with the wireless communications network.

Paragraph 32. A method according to Paragraph 31, wherein the method comprises, in response to receiving the indication that the communications device has re-acquired uplink synchronisation with the wireless communications network, transmitting, to the communications device via the non-terrestrial network apparatus, signalling indicating that the communications device should either continue or restart communications with the wireless communications network.

Paragraph 33. A method according to Paragraph 31 or Paragraph 32, wherein the method comprises, in response to receiving the indication that the communications device has re-acquired uplink synchronisation with the wireless communications network, determining that the infrastructure equipment is to prioritise further communications with the communications device over communications with other communications devices which are currently not operating in a connected mode with the wireless communications network.

Paragraph 34. A method according to any of Paragraphs 26 to 33, wherein the information for use by the communications device in re-acquiring uplink synchronisation comprises an indication that the communications device is to transition from a connected mode with the wireless communications network in which the communications device is currently operating in into one of an idle mode and an inactive mode.

Paragraph 35. A method according to Paragraph 34, wherein the information for use by the communications device in re-acquiring uplink synchronisation comprises an indication that the communications device, following transitioning from the connected mode, is to perform an initial access procedure with the wireless communications network so as to transition back to the connected mode.

Paragraph 36. A method according to any of Paragraphs 26 to 35, wherein the first time is a first invalidity time associated with first motion information of the non-terrestrial network apparatus, and the second time is a second invalidity time associated with second motion information of the non-terrestrial network apparatus, wherein the first motion information and the second motion information are different.

Paragraph 37. A method according to Paragraph 36, wherein the information for use by the communications device in re-acquiring uplink synchronisation comprises indications of the second motion information of the non-terrestrial network apparatus and the second invalidity time.

Paragraph 38. A method according to Paragraph 36 or Paragraph 37, wherein the information for use by the communications device in re-acquiring uplink synchronisation comprises an indication that the communications device is to read system information broadcast by the wireless communications network, the system information comprising indications of the second motion information of the non-terrestrial network apparatus and the second invalidity time.

Paragraph 39. A method according to Paragraph 37 or Paragraph 38, comprising determining, based on transmitting the information for use by the communications device in re-acquiring uplink synchronisation, that the communications device has re-acquired uplink synchronisation with the wireless communications network.

Paragraph 40. A method according to any of Paragraphs 36 to 39, comprising determining that the first invalidity time has been reached, and broadcasting system information comprising indications of the second motion information of the non-terrestrial network apparatus and the second invalidity time.

Paragraph 41. A method according to any of Paragraphs 36 to 40, comprising determining that the first invalidity time has been reached, and transmitting paging information to the communications device, the paging information comprising an indication that the second motion information of the non-terrestrial network apparatus and the second invalidity time are available for acquisition by the communications device.

Paragraph 42. A method according to any of Paragraphs 26 to 41, comprising waiting until a third time following the step of transmitting the signal comprising information for use by the communications device in re-acquiring uplink synchronisation, the third time being a time by which the infrastructure equipment determines that the communications device is able to re-acquire uplink synchronisation, transmitting, to the communications device via the non-terrestrial network apparatus at the third time, a downlink signal, receiving, from the communications device via the non-terrestrial network apparatus, an uplink signal in response to the transmitted downlink signal, and determining, based on the received uplink signal, that the communications device has re-acquired uplink synchronisation.

Paragraph 43 A method according to any of Paragraphs 26 to 42, comprising receiving, from each of one or more other communications devices via the non-terrestrial network apparatus before the first time, an indication that the each of the one or more other communications devices will lose uplink synchronisation with the wireless communications network.

Paragraph 44. A method according to Paragraph 43, comprising determining if the number of the communications device and the one or more other communications devices is above a predefined threshold, and transmitting, if it is determined that the number of the communications device and the one or more other communications devices is above the predefined threshold, different back-off times to each of the communications device and the one or more other communications devices via the non-terrestrial network apparatus, wherein the different back-off times indicate a period during which the each of the communications device and the one or more other communications devices is not allowed to transmit signals to the wireless communications network.

Paragraph 45. A method according to Paragraph 43 or Paragraph 44, comprising transmitting, to each of the communications device and the one or more other communications devices via the non-terrestrial network apparatus in the same temporal order in which each of the indications were received, a signal comprising information for use by the each of the communications device and the one or more other communications devices in re-acquiring uplink synchronisation with the wireless communications network until at least the second time.

Paragraph 46. A method according to Paragraph 45, wherein the first time is a first invalidity time associated with first motion information of the non-terrestrial network apparatus, and the second time is a second invalidity time associated with second motion information of the non-terrestrial network apparatus, wherein the first motion information and the second motion information are different.

Paragraph 47. A method according to any of Paragraphs 26 to 46, wherein the infrastructure equipment is implemented within the non-terrestrial network apparatus.

Paragraph 48. A method according to any of Paragraphs 26 to 47, wherein the infrastructure equipment is mounted upon the non-terrestrial network apparatus.

Paragraph 49. A method according to any of Paragraphs 26 to 48, wherein the infrastructure equipment is a ground-based base station, and wherein the non-terrestrial network apparatus relays communications between the communications device and the infrastructure equipment.

Paragraph 50. An infrastructure equipment forming part of a wireless communications network, the infrastructure equipment comprising transceiver circuitry configured to transmit signals to and/or to receive signals from a communications device via a non-terrestrial network apparatus of the wireless communications network, and controller circuitry configured in combination with the transceiver circuitry to receive, from the communications device via the non-terrestrial network apparatus, an indication that the communications device will lose uplink synchronisation with the wireless communications network, and to transmit, to the communications device via the non-terrestrial network apparatus before a first time at which the communications device will lose uplink synchronisation with the wireless communications network and in response to the received indication, a signal comprising information for use by the communications device in re-acquiring uplink synchronisation with the wireless communications network until at least a second time, the second time being later than the first time.

Paragraph 51. Circuitry for an infrastructure equipment forming part of a wireless communications network, the infrastructure equipment comprising transceiver circuitry configured to transmit signals to and/or to receive signals from a communications device via a non-terrestrial network apparatus of the wireless communications network, and controller circuitry configured in combination with the transceiver circuitry to receive, from the communications device via the non-terrestrial network apparatus, an indication that the communications device will lose uplink synchronisation with the wireless communications network, and to transmit, to the communications device via the non-terrestrial network apparatus before a first time at which the communications device will lose uplink synchronisation with the wireless communications network and in response to the received indication, a signal comprising information for use by the communications device in re-acquiring uplink synchronisation with the wireless communications network until at least a second time, the second time being later than the first time.

Paragraph 52. A wireless communications system comprising a communications device according to Paragraph 24 and an infrastructure equipment according to Paragraph 50.

Paragraph 53. A computer program comprising instructions which, when loaded onto a computer, cause the computer to perform a method according to any of Paragraphs 1 to 23 or Paragraph 26 to 49.

Paragraph 54. A non-transitory computer-readable storage medium storing a computer program according to Paragraph 53.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811 V15.4.0, "Study on New Radio (NR) to support non terrestrial networks (Release 15)", 3rd Generation Partnership Project, October 2020.

[2] Holma H. and Toskala A, "LTE for UMTS OFDMA and SC-FDMA based radio access", John Wiley and Sons, 2009.

[3] TR 38.821 V16.0.0, "Solutions for NR to support Non-Terrestrial Networks (NTN)" 3rd Generation Partnership Project, January 2020.

[4] RP-202908, "Solutions for NR to support non-terrestrial networks (NTN)", Thales, RANP #90e, December 2020.

[5] RP-193235, "New Study WID on NB-IoT/eMTC support for NTN", MediaTek Inc. RANP #86, December 2019.

[6] TR 36.763, "Study on Narrow-Band Internet of Things (NB-IoT)/enhanced Machine Type Communication (eMTC) support for Non-Terrestrial Networks (NTN) (Release 17)", 3rd Generation Partnership Project, June 2021.

[7] RP-211601, "WID on NB-IoT/eMTC support for NTN", MediaTek Inc. RANP #92e, June 2021

[8] European patent application number EP21200375.0.

What is claimed is:

1. A method of operating a communications device for transmitting signals to and/or receiving signals from a non-terrestrial network apparatus of a wireless communications network, the method comprising determining that the communications device will lose uplink synchronisation with the wireless communications network at a first time, transmitting, to the non-terrestrial network apparatus before the first time, an indication that the communications device will lose uplink synchronisation with the wireless communications network, receiving, from the non-terrestrial network apparatus before the first time and in response to the transmitted indication, a signal comprising information for use by the communications device in re-acquiring uplink synchronisation with the wireless communications network until at least a second time, the second time being later than the first time, the first time being a first invalidity time associated with first motion information of the non-terrestrial network apparatus, the second time being a second invalidity time associated with second motion information of the non-terrestrial network apparatus, the first motion information and the second motion information being different, and the second invalidity time being signaled by the wireless communications network to the communications device in association with the second motion information, and re-acquiring, based at least in part on the received information, uplink synchronisation with the wireless communications network until the second time.

2. A method according to claim 1, wherein the step of re-acquiring uplink synchronisation with the wireless communications network until the second time is performed before the first time.

3. A method according to claim 1, comprising performing, following transmission of the indication that the communications device will lose uplink synchronisation with the wireless communications network, a radio link failure, RLF, procedure, wherein the RLF procedure comprises the step of receiving the signal comprising information for use by the communications device in re-acquiring uplink synchronisation and the step of re-acquiring uplink synchronisation.

4. A method according to claim 1, wherein the indication that the communications device will lose uplink synchronisation with the wireless communications network is transmitted within a random access, RACH, procedure message.

5. A method according to claim 4, wherein the RACH procedure message comprises one of a preconfigured set of preambles, the preconfigured set of preambles being specific for the purpose of indicating that the communications device will lose uplink synchronisation with the wireless communications network.

6. A method according to claim 1, wherein the indication that the communications device will lose uplink synchronisation with the wireless communications network is transmitted within a radio resource control, RRC, message.

7. A method according to claim 6, wherein, prior to transmitting the RRC message comprising the indication that the communications device will lose uplink synchronisation with the wireless communications network, the method comprises transmitting, to the non-terrestrial network apparatus, a request for uplink resources, receiving, from the non-terrestrial network apparatus, an indication of uplink resources for transmission of the RRC message by the communications device, and transmitting, to the non-terrestrial network apparatus within the indicated uplink resources, the RRC message comprising the indication that the communications device will lose uplink synchronisation with the wireless communications network.

8. A method according to claim 1, wherein the step of re-acquiring uplink synchronisation comprises one or more of:

determining a location of the communications device, determining a velocity of the communications device, receiving ephemeris information of the non-terrestrial network apparatus, determining a location of the non-terrestrial network apparatus, determining a velocity of the non-terrestrial network apparatus, performing a recalculation of a timing advance of the communications device, and performing a recalculation of a Doppler frequency of the communications device with respect to the non-terrestrial network apparatus.

9. A method according to claim 1, wherein the information for use by the communications device in re-acquiring uplink synchronisation comprises an indication of uplink resources, and wherein the method comprises transmitting, to the non-terrestrial network apparatus within the indicated uplink resources after re-acquiring uplink synchronisation, an indication that the communications device has re-acquired uplink synchronisation with the wireless communications network.

10. A method according to claim 1, wherein the information for use by the communications device in re-acquiring uplink synchronisation comprises an indication that the communications device is to transition from a connected mode with the wireless communications network in which the communications device is currently operating in into one of an idle mode and an inactive mode, and wherein the method comprises transitioning from the connected mode into the idle mode or the inactive mode.

11. A method according to claim 10, wherein the information for use by the communications device in re-acquiring uplink synchronisation comprises an indication that the communications device, following transitioning from the connected mode, is to perform an initial access procedure with the wireless communications network so as to transition back to the connected mode, and wherein the method comprises performing the initial access procedure with the wireless communications network to transition back into the connected mode.

12. A method according to claim 1, wherein the information for use by the communications device in re-acquiring uplink synchronisation comprises indications of the second motion information of the non-terrestrial network apparatus and the second invalidity time.

13. A method according to claim 1, wherein the information for use by the communications device in re-acquiring uplink synchronisation comprises an indication that the communications device is to read system information broadcast by the wireless communications network, the system information comprising indications of the second motion information of the non-terrestrial network apparatus and the second invalidity time, and wherein the method comprises reading the broadcasted system information.

14. A method according to claim 1, wherein the step of re-acquiring uplink synchronisation comprises one or more of:

determining a location of the communications device, determining a velocity of the communications device, determining a location of the non-terrestrial network apparatus, determining a velocity of the non-terrestrial network apparatus, performing a recalculation of a timing advance of the communications device, and performing a recalculation of a Doppler frequency of the communications device with respect to the non-terrestrial network apparatus, wherein the communications device determines at least one of the location of the non-terrestrial network apparatus and the velocity of the non-terrestrial network apparatus based on the second motion information.

15. A method according to claim 1, wherein the communications device determines that it will lose uplink synchronisation with the wireless communications network at the first time based on the first time being a first invalidity time associated with first motion information of the non-terrestrial network apparatus.

16. A method according to claim 1, wherein the communications device determines that it will lose uplink synchronisation with the wireless communications network at the first time based on receiving a paging message from the wireless communications network, the paging message indicating that first motion information of the non-terrestrial network apparatus known to the communications device is out of date and that second motion information of the non-terrestrial network apparatus and a second invalidity time are available for acquisition by the communications device, wherein the first motion information and the second motion information are different, and wherein the second time is the second invalidity time.

17. A method according to claim 1, wherein the communications device determines that it will lose uplink synchronisation with the wireless communications network at the first time based on a velocity of the communications device being above a predefined threshold.

18. A communications device comprising transceiver circuitry configured to transmit signals to and/or to receive signals from a non-terrestrial network apparatus of a wireless communications network, and controller circuitry configured in combination with the transceiver circuitry to determine that the communications device will lose uplink synchronisation with the wireless communications network at a first time, to transmit, to the non-terrestrial network apparatus before the first time, an indication that the communications device will lose uplink synchronisation with the wireless communications network, to receive, from the non-terrestrial network apparatus before the first time and in response to the transmitted indication, a signal comprising information for use by the communications device in re-acquiring uplink synchronisation with the wireless communications network until at least a second time, the second time being later than the first time, the first time being a first invalidity time associated with first motion information of the non-terrestrial network apparatus, the second time being a second invalidity time associated with second motion information of the non-terrestrial network apparatus, the first motion information and the second motion information being different, and the second invalidity time being signaled by the wireless communications network to the communications device in association with the second motion information, and to re-acquire, based at least in part on the received information, uplink synchronisation with the wireless communications network until the second time.

19. An infrastructure equipment forming part of a wireless communications network, the infrastructure equipment comprising transceiver circuitry configured to transmit signals to and/or to receive signals from a communications device via a non-terrestrial network apparatus of the wireless communications network, and controller circuitry configured in combination with the transceiver circuitry to receive, from the communications device via the non-terrestrial network apparatus, an indication that the communications device will lose uplink synchronisation with the wireless communications network, and to transmit, to the communications device via the non-terrestrial network apparatus before a first time at which the communications device will lose uplink synchronisation with the wireless communications network and in response to the received indication, a signal comprising information for use by the communications device in re-acquiring uplink synchronisation with the wireless communications network until at least a second time, the second time being later than the first time, the first time being a first invalidity time associated with first motion information of the non-terrestrial network apparatus, the second time being a second invalidity time associated with second motion information of the non-terrestrial network apparatus, the first motion information and the second motion information being different, and the second invalidity time being signaled by the wireless communications network to the communications device in association with the second motion information.

* * * * *